United States Patent [19]
Ferguson et al.

[11] Patent Number: 5,293,614
[45] Date of Patent: Mar. 8, 1994

[54] SYSTEM AND METHOD FOR HARD REAL-TIME GARBAGE COLLECTION REQUIRING A WRITE BARRIER BUT NO READ BARRIER

[75] Inventors: Edward E. Ferguson, Plano; David H. Bartley, Dallas, both of Tex.; Timothy J. McEntee, Milford, Ohio

[73] Assignee: Texas Instruments Incorporated, Dallas, Tex.

[21] Appl. No.: 682,806

[22] Filed: Apr. 8, 1991

[51] Int. Cl.$^5$ .................. G06F 12/12; G06F 12/16
[52] U.S. Cl. .................... 395/600; 395/425; 364/280; 364/281.1; 364/282.1; 364/282.2; 364/245; 364/245.2
[58] Field of Search .................. 364/DIG. 1, DIG. 2, 364/967, 967.4, 967.5, 246.11, 246.7, 281.1, 281.6; 395/425, 600, 650, 700, 725

[56] References Cited

U.S. PATENT DOCUMENTS

| | | | |
|---|---|---|---|
| 4,797,810 | 1/1989 | McEntee et al. | 395/425 |
| 4,807,120 | 2/1989 | Courts | 395/425 |
| 4,907,151 | 3/1990 | Bartlett | 395/425 |
| 4,989,134 | 1/1991 | Shaw | 395/425 |
| 5,088,036 | 2/1992 | Ellis et al. | 395/425 |
| 5,136,706 | 8/1992 | Courts | 395/600 |

OTHER PUBLICATIONS

Baker, Henry G., "List Processing in Real Time on a Serial Computer", Communications of the ACM. Apr. 1978, pp. 280-294.
Appel, Andrew W. et al., "Real-time Concurrent Collection of Stock Multiprocessors", SigPLAN 1988, pp. 11-20.
Courts, Robert, "Improving Locality of Reference in a Garbage-Collecting Memory Management System", Communications of the ACM. Sep. 1988, vol. 31, No. 9, pp. 1128-1138.
Moon, David A., "Garbage Collection in a Large Lisp System", ACM Symposium on LISP and Functional Programming, 1984, pp. 235-246.
Steele, Jr., Guy L., "Multiprocessing Compactifying Garbage Collection," Communications of the ACM, vol. 18, No. 9, Sep. 1975, pp. 495-508.

Primary Examiner—Paul V. Kulik
Attorney, Agent, or Firm—Robert L. Troike; Leo N. Heiting; Richard L. Donaldson

[57] ABSTRACT

Generally, in one form of the invention, a computer system for executing application programs in hard real-time, comprises a central processing unit (CPU) for executing the application programs and system programs and a computer memory partitioned into a data memory and a code memory. A garbage collector, which executes on said CPU, places a write barrier over certain portions of memory. Furthermore, it transfers an object from a location in the memory to a second object at another location in the memory. In a critical section, which may not be interrupted, it allocates sufficient space for the second object so that the entire contents from the first object can be copied into the second object, and in an interruptable section, it copies the entire contents of the first object into the second object. A write routine is linked into the application programs for updating objects in the computer memory. The write routine is operable to update both the first object and the second object whenever the garbage collector is transferring the contents of the object into the second object. Both copies are thereby kept current.

6 Claims, 8 Drawing Sheets

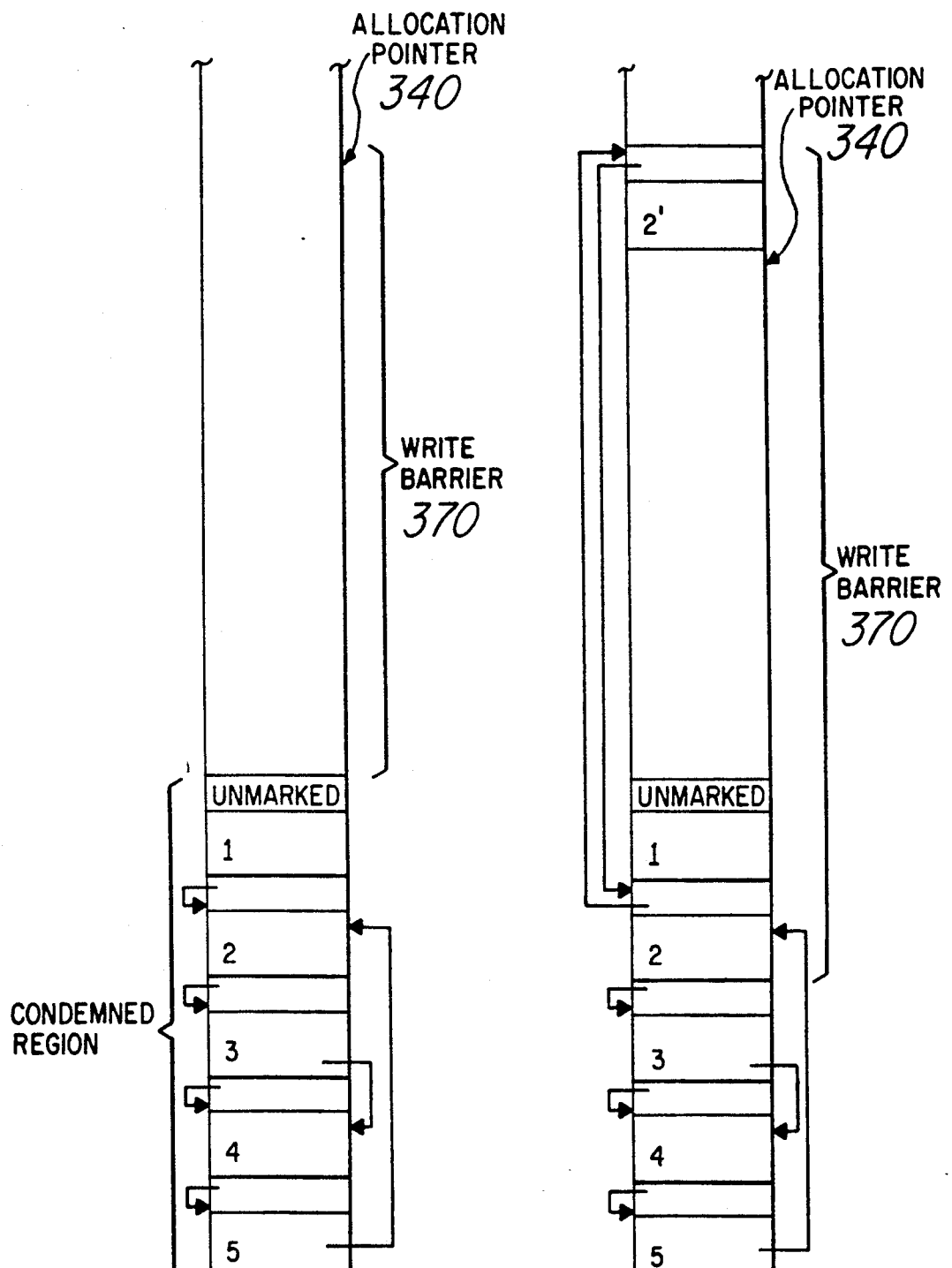

SYSTEM AND METHOD FOR HARD REAL-TIME GARBAGE COLLECTION REQUIRING A WRITE BARRIER BUT NO READ BARRIER

NOTICE (C) Copyright Texas Instruments Incorporated 1991. A portion of the disclosure of this patent document contains material which is subject to copyright. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention generally relates to real-time systems, in particular it relates to garbage collectors for memory reclamation in systems with hard deadlines.

2. Description of the Related Art

Run-time support systems for most modern programming languages provide a memory management package with which the user can dynamically allocate and deallocate storage for objects. Some memory management packages are automatic in the sense that they reclaim the storage associated with an object when the package can determine that the application can no longer use that object. The component that performs this service is commonly called the garbage collector.

Automatic memory management is a valuable tool for complex applications. It can simplify the task of an application programmer since he can use complex dynamic data structures without having to explicitly determine constituent lifetimes. This freedom can result in more robust applications since subtle errors involving premature or missed deallocation are not possible. Automatic memory management is a fundamental or desirable feature of many programming languages.

Many garbage collectors have been described that are real-time in the sense that they can be guaranteed to reclaim memory faster than the application can allocate it. This macro-level property is not sufficient for a hard real-time system since it is still possible for deadlines to be missed due to micro-level side effects of executing the collector. It is desirable to have a garbage collector that is compatible with hard real-time execution.

A first problem in implementing a real-time garbage collector is providing adequate computational resources to reclaim storage. The time required to reclaim memory is typically much longer than the execution times and deadlines of the hard real-time tasks because reclamation must access a significant fraction of system memory. For the system to be responsive to external events while reclamation is occurring, a procedure may be used for memory reclamation whose execution is interleaved with application tasks.

Another problem is minimizing the impact of the collector on the schedulability of application tasks. Methods for memory reclamation typically involve scanning objects, relocating pointers, and copying objects. These operations cannot be safely interrupted by application tasks that use the automatic memory management abstraction and thus become critical sections during which execution of the application is blocked. It is essential that the duration of such atomic operations be tightly bounded so the reclamation process's interference with the application tasks can be assessed and held to practical values For example, a procedure that must copy an object atomically is undesirable if worst-case behavior must be handled; any task has the potential to be delayed for the time required to copy the largest allocated object.

Another problem is maintaining predictable execution times for application tasks. The choice of reclamation method can affect the execution time of an application task due to the overhead associated with invoking the memory management abstraction. For example, some designs have the property that any access to an object may require that the object be copied from one area of storage to another. It is important to design a procedure that has a uniform and tightly bound overhead so it is possible to automatically or manually determine the execution time of application tasks.

One category of garbage collectors is "copying" collectors. In these, live objects are separated from dead (garbage) objects by copying the live objects to a new area and discarding the dead objects and the original instances of the live objects. This type of collector has the advantage that it compacts the live objects together. However, it has the disadvantage that references to old objects must be adjusted to point to the new copies. Typical implementations use "barriers" on read, write, and object identity tests that occur in application programs. The barriers ensure that consistency is maintained while objects are being transported. Because read operations tend to be more frequent than write and identity tests, it is more efficient to not require a read barrier; accordingly, it is desirable to require the special handling, required by a "barrier," only on write and identity test operations.

Accordingly, improvements which overcome any or all of the problems are presently desirable.

SUMMARY

Generally, in one form of the invention, a computer system for executing application programs in hard real-time comprises a central processing unit (CPU) for executing the application programs and system programs and a computer memory partitioned into a data memory and a code memory. A garbage collector, which executes on the CPU, places a write barrier over certain portions of memory. Furthermore, it transfers an object from a location in said memory to a second object at another location in the memory. In a critical section, which may not be interrupted, it allocates sufficient space for the second object so that the entire contents from the first object can be copied into the second object, and in an interruptable section, it copies the entire contents of the first object into the second object. A write routine is linked into the application programs for updating objects in said computer memory. The write routine is operable to update both the first object and the second object whenever the garbage collector is transferring the contents of the object into the second object. Both copies are thereby kept consistent.

An advantage of the invention is that the garbage collector may execute as a separately schedulable task. A further advantage of the invention is that it uses no read barrier. A third advantage of the invention is that the critical section, during which the garbage collector may not be interrupted, is of a fixed predictable duration.

BRIEF DESCRIPTION OF THE DRAWINGS

FIGS. 7(a) and 7(b) show an example of memory being processed by phase three of the garbage collector according to the present invention;

Corresponding numerals and symbols in the different figures refer to corresponding parts unless otherwise indicated.

DETAILED DESCRIPTION OF THE PREFERRED EMBODIMENTS

Figure 1:
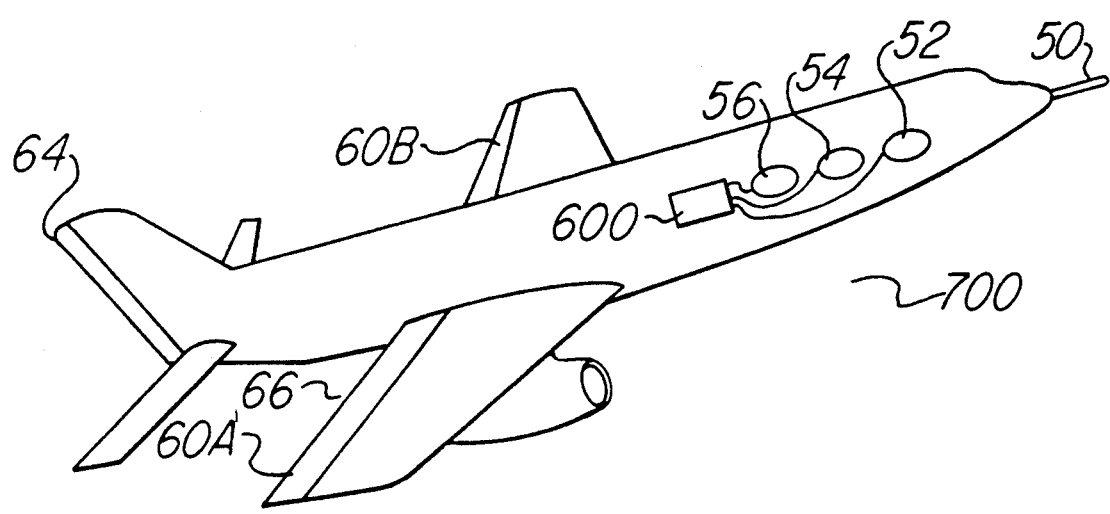
FIG. 1 is a vehicle which uses an embedded system to collect sensory data and to control the vehicle.

In FIG. 1, an airborne vehicle 700 has a computer system 600 connected to sensors 50, 52, 54, and 56. Computer system 600 obtains data, concerning airborne vehicle 700, such as altitude, air speed, direction, and radar information. Computer software (not shown) resident in computer system 600 analyzes this data and advises the pilot of the vehicle. In an alternative embodiment, computer system 600, by way of software, controls the flight of the vehicle. In this case, computer system 600 has access to control mechanisms, for example elevators 60A and 60B, a rudder 64 and the throttle control for an engine 66.

In both cases computer system 600 operates in hard real-time, meaning that computer programs executing on computer system 600 have hard deadlines, which is to say that it is not only desirable to meet the deadlines, but that failing to do so can have fatal consequences.

Figure 2A:
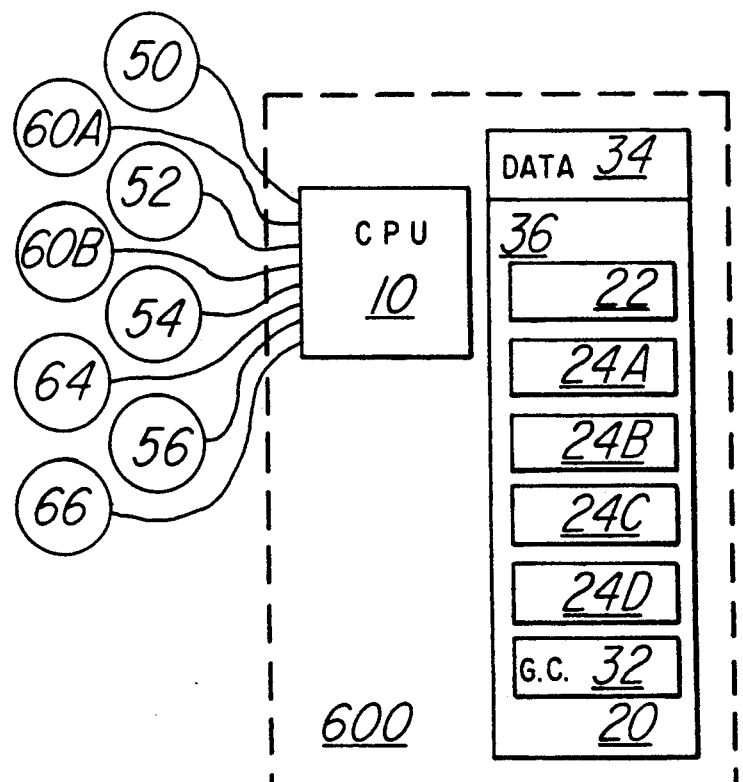
FIGS. 2(a) and 2(b) show both hardware and software used to control a vehicle.
Figure 2B:
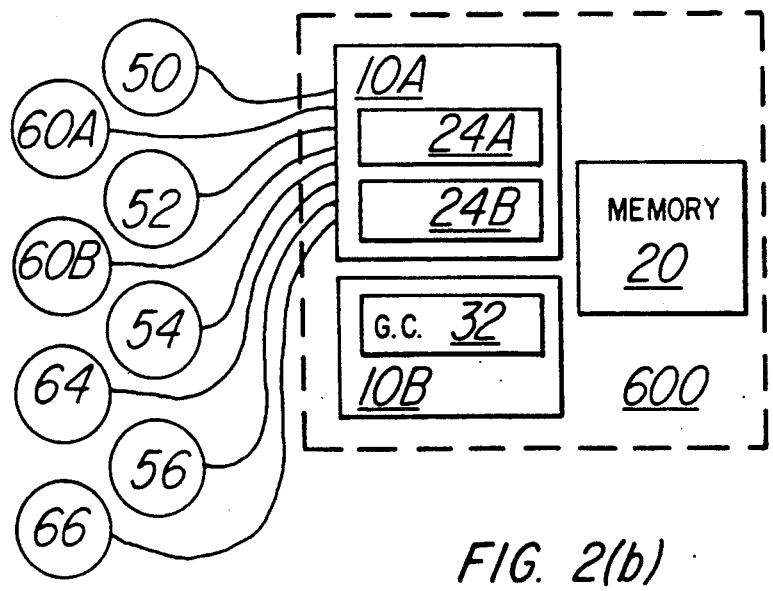

FIG. 2(a) shows as an example a preferred embodiment of the computer hardware and software of computer system 600. Computer system 600 is connected to sensors 50 through 56 and device controllers 60 and 64. Computer system 600 includes a central processing unit (CPU) 10 connected to a computer memory 20, which stores programs 22 through 32 which CPU 10 executes. Some of these programs are system programs, such as a job scheduler 22 and a garbage collector (GC) 32. Others programs, 24A, 24B, 24C, and 24D, are application programs which may be used to control specific devices, for example control surfaces 60 and 64, and application programs used to analyze data obtained from sensors 50 through 56. Computer memory 20 also contains a data memory 34, in which programs 22 and 24 store data. GC 32 does memory reclamation in data memory 34. FIG. 2(b) shows an alternative embodiment of computer system 600, in which two processors 10A and 10B both access memory 20. The garbage collector 32 executes on processor 10B, while application programs 24 execute on processor 10A.

The above described computer systems are used for illustrative purposes and should not be construed as limitations. In particular, there is neither a limitation on the number of application programs nor is there a limitation to flight system applications. A person skilled in the art will realize that there are many other environments wherein garbage collector 32 is a useful improvement. Furthermore, garbage collector 32 may be implemented either in software or in hardware, as a logic circuit or in firmware.

Figure 3:
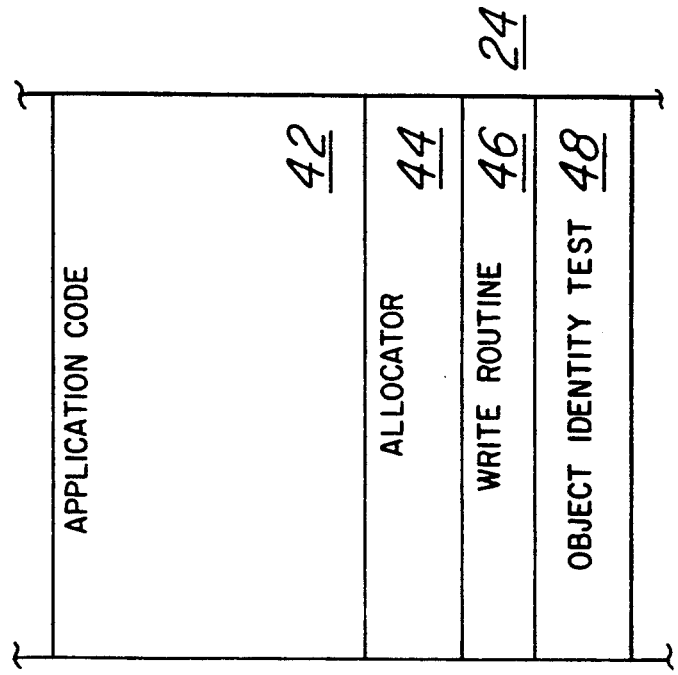
FIG. 3 shows the software modules linked together to form one application program.

FIG. 3 is a diagram of an application program 24. An application program consists of some application code 42, an allocator 44, a write routine 46, and an object identity test 48. The allocator 44, the write routine 46, and the object identity test 48 may be parts of subroutine libraries, and they are linked with the application code 42 to form one executable unit 24. In alternative embodiments the allocator 44, the write routine 46, and the object identity test 48, are implemented in hardware, as a logic circuit, or in firmware. In which case, rather than being linked into application program 24, those elements are invoked directly through the execution of the corresponding instructions.

The allocator 44 is responsible for memory allocation, and the write routine 46 manages the necessary overhead with which the application code 42 must contend in order to have real-time garbage collection. The logic which comprises this overhead is described in greater detail below, in conjunction with Phases 1, 2, 3, and 4.

Figure 4:
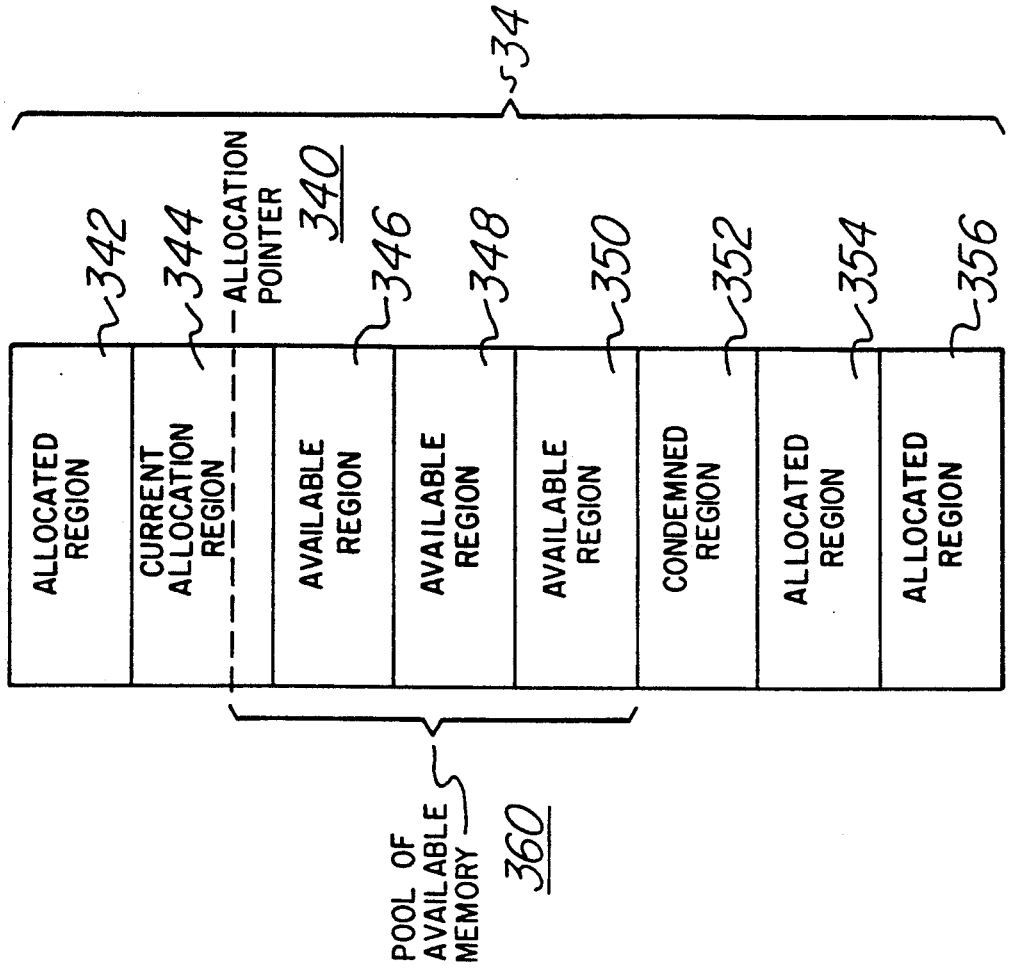
FIG. 4 shows a view of the various regions which make up the data memory of a computer.

FIG. 4 is a schematic of data memory 34. Data memory 34 is divided into permanent fragments of memory regions 340-356. The regions may be, but do not necessarily have to be, contiguous. Furthermore, the regions may vary in size.

Each region is a spatial division. The number of regions will vary depending on the system. Objects are allocated at allocation pointer 340, which points to the next available memory word for allocation. Only one allocation pointer exists. After an object is allocated, allocation pointer 340 is advanced to the next word following the new object. Memory 34 is treated as if it were circular. When the highest memory address has been allocated, allocation pointer 340 is set to the lowest memory location where objects can be allocated. While the regions themselves are contiguous blocks of memory, the regions do not need to be contiguous with respect to each other. Logically, the regions are arranged in a queue. However, in physical memory there is no restriction on their arrangement.

The portion of memory 20 under consideration does not include a fixed area of memory 20 outside of garbage collector 32's domain which may be desirable in a system implementation; e.g. in FIG. 2, an area 36 of memory 20 contains all code block objects, which might be required to be non-relocatable. The code block objects will not contain any external pointers; therefore, they will not need to be scanned during garbage collection. However, it is possible to store code block objects in data memory 34.

An object cannot cross a region's boundary. If the number of available words left in the region which contains allocation pointer 340 (from allocation pointer 340 to the region's end) is less than the size of the object to be allocated or transported, the object is placed at the first word of the successive region. If an application requires objects of greater size than the region, it is expected such objects will be allocated in an area of memory outside the confines of the garbage collector described here.

A single region, condemned region 352, is garbage collected at a time. Specifically, and viewing memory 34 circularly, it is the first allocated region; i.e., a region containing allocated objects, following allocation pointer 340. Garbage collector 32 adds to the pool of available memory from the "bottom" while the allocator keeps using it from the "top." During garbage collection objects are moved from condemned region 352 into one of the surviving regions, for example the current allocation region 344.

Allocation pointer 340 may not advance into condemned region 352. If it does, the computer has run out of available memory.

FIG. 6 shows an example of condemned region 352. Each object 1-5, at its allocation, will include a mark word 1000, a word of memory used exclusively by garbage collector 32. Each mark word 1000 is initialized to the value 'UNMARKED' at the time of the object's allocation. Other values which can exist in a mark word 1000, depending on the garbage collection phase, are 'MARK,' an integer used as a pointer to another object, and 'NIL' to indicate that the object is the end of a linked list.

Figure 5:
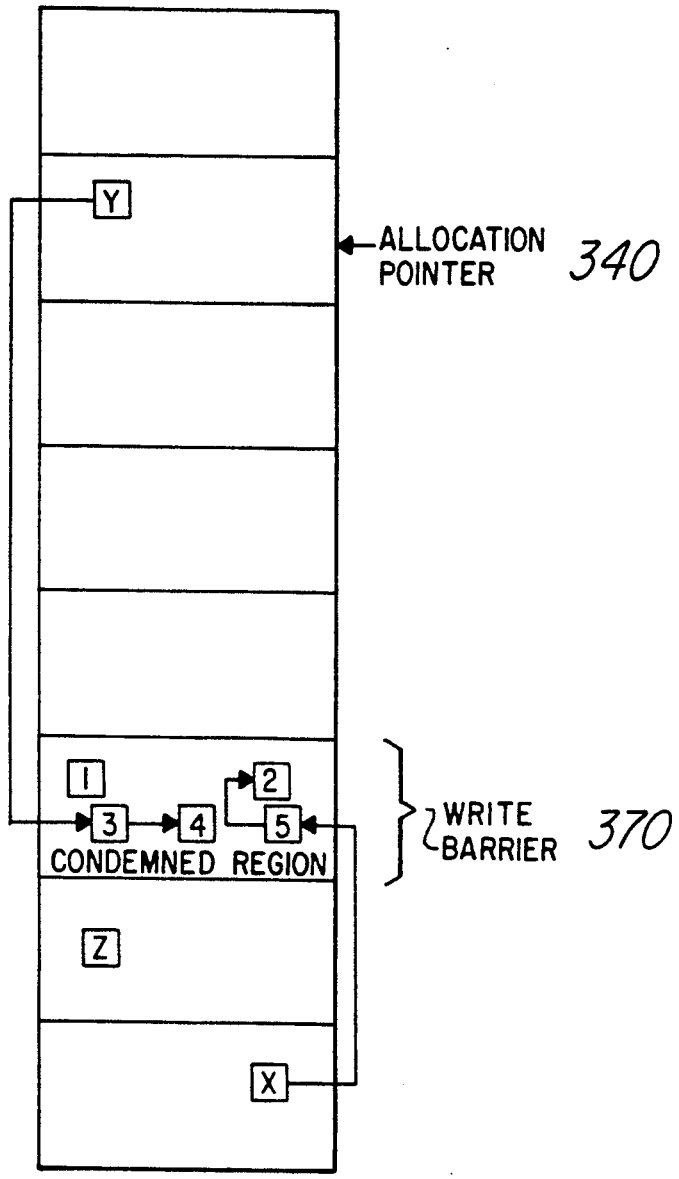
FIG. 5 shows an example data memory during phase one of a garbage collector according to the present invention.

A write barrier 370, shown in FIGS. 5, 7, and 8, enables interleaving of garbage collection processing with application processing. A viable implementation of the write barrier is to place the two boundaries of the write barrier in dedicated registers. In the case where the regions are allowed to be arranged in a non-contiguous fashion within the physical memory, write barrier 370 is slightly more complicated in that two registers would be insufficient. One solution is to associate a set of write barrier registers with each region of memory. The write barrier 370 may also be implemented in the memory hardware.

Write barrier 370 surrounds a subset of contiguous memory locations, and the action of the barrier comes into play when a value is written to a word of memory 34. During certain phases of a reclamation, special handling occurs when a reference to an object within the barrier is being written. During other phases, special handling occurs when any value is written into a word in an object residing within the write barrier.

The "special handling" is extra code for the application processes which is required to enable interleaving of garbage collection processing and application processing. This code is part of the write routine 46, shown in Table 1. The garbage collection phases, described below, are not application code overhead, since garbage collection is a separately schedulable task.

The garbage collector 32 operates in five phases, each of which is described below.

The pseudocode listing of Table 1 below shows the details of the operation of the write routine 46:

TABLE 1

| | |
|---|---|
| 800 | Write routine (ADDRESS, VALUE) |
| 802 | Which phase is GC 32 in? |
| 804 | Phase 1: |
| 806 | IF VALUE is a pointer whose referent is in Condemned region 352 and ADDRESS is a location outside of condemned region 352, THEN, |
| 808 | Mark the referent object |
| 810 | Phase 2: |
| 811 | IF VALUE is a pointer whose referent is in condemned region 352 and the mark word 1000 of the referent object is UNMARKED, THEN, |
| 812 | Add the referent object to the list pointed to by register TO-SCAN |
| 813 | Phase 3 and Phase 4: |

TABLE 1-continued

| | |
|---|---|
| 814 | IF ADDRESS is within the write barrier AND the mark word 1000 of the object to which ADDRESS belongs points to another object, THEN, |
| 816 | Write VALUE into both objects |
| 818 | Phase 4: |
| 820 | IF VALUE is a pointer whose value is within the write boundary, THEN, |
| 822 | Modify the value to point to the transported copy |
| 824 | Phase 5: (No Special Handling) |

First it shows that the write routing is called with an address at which to write a value. This is indicated by the entry point 800.

The first step of write routine 46 (Step 802) is to determine in which phase garbage collector 32 is currently operating. Depending on the phase, one of five logic blocks (beginning at statements 804, 810, 813, 818, and 824, respectively, or a combination thereof, is executed. Each of those blocks are discussed below in conjunction with their corresponding garbage collection phases.

Phase 1

Table 2 shows the steps of Phase 1, in which each object within the condemned region 352 that is referenced by one or more objects external to the condemned region 352 is marked as live.

TABLE 2

| | |
|---|---|
| 101 | Set write Barrier boundaries beginning and end of condemned region. |
| 103 | Save copy of allocation pointer. |
| 105 | Scan boxed memory locations in allocated regions for references to objects in the condemned region: |
| 107 | Scan all words beginning with the first word in condemned region to the copied allocation pointer: |
| 109 | If the word being scanned is a reference to an object in the condemned region then |
| 111 | mark that object by writing "MARK" in the object's mark word. |

The boundaries of the write barrier 370 are placed at the beginning and end of the condemned region 352 (Step 101).

Because application programs execute in parallel with garbage collector 32, allocation pointer 340 may advance during the execution of garbage collector 32. However, certain garbage collection scanning operations need only proceed up to the allocation location when Phase 1 begins. Therefore, a copy of the current value of allocation pointer 340 is first saved (Step 103).

All boxed memory locations in allocated regions are then scanned for references (pointers) to objects in the condemned region. A boxed object is an object that may contain pointers. Thus, a boxed memory location is a memory location within a boxed object. To scan for references, which is indicated by step 105, the collector 32 begins at the first word in the region just after the condemned region 352 and scans until reaching the address specified by the copied allocation pointer 340 (Step 107). The allocation location may have advanced beyond the copied allocation pointer. Therefore, because any objects allocated once the scan begins cannot have pointers to the condemned region 352 without triggering the write barrier, it is not necessary to scan to the current location of the allocation pointer 340.

When a word being scanned is found to be a reference to an object within the condemned region 352, which may be done by comparing the referent address against the write barrier boundary values (Step 109), that condemned region object is marked by writing the value 'MARK' in its mark word 1000 (Step 111). The result of the scanning process of block 105 is that any object within the condemned region 352 that is referenced by a storage cell external to the condemned region 352 is detected and marked.

An example memory situation is shown in FIG. 5. The reference to object 5 from object X will be detected as object X is scanned. Object 5 is therefore marked. Later, the cell in object Y which references object 3 is scanned, the reference detected, and object 3 is marked.

As indicated in Table 1, during phase 1, any write to a word in memory requires a check to determine whether the written word is a pointer whose referent is in the condemned region, by comparing the pointer value against the write barrier boundaries, and whether the location where the reference is being written is in a region other than the condemned region. This check is done by write routine 46 in the block of code beginning at statement 806 of Table 1. If it is such a reference, the object within the condemned region 352 is marked (Step 808 of Table 1) just as if it had been detected by the scan in step 105 of Table 2. (The check that the location being written is outside the condemned region may be omitted. Conceivably, this could result in a garbage object surviving when it should have been reclaimed.)

Again referring to FIG. 5, an application process could read object Y's cell which references object 3 and write it into a cell in object Z. As the reference is written into object Z, write routine 46 detects the special circumstance wherein the value written to an object within the write barrier (Step 806 of Table 1). Therefore, it marks object 3 (Step 808 of Table 1).

Marking object 3 twice (when object Y is scanned and when the reference is written in object Z) may appear redundant. However, it is necessary in order to ensure that all objects in the condemned region which are referenced externally are marked. Without the write barrier, the following could occur with erroneous results: 1) the scanner is about to scan the cells in object X (the scanner has already passed through object Z); 2) the reference to object 3 is copied from object Y to object Z (there is no write barrier and therefore object 3 is not marked); 3) the cell in object Y which references object 3 is written over with some other value; 4) the scanner finally scans object Y and has no knowledge of the overwritten reference to object 3. The results of this scenario, without the write barrier, are catastrophic. An external reference to object 3 (from object Z) exists, yet object 3 is not marked to indicate it must survive reclamation.

Phase 2

Table 3 shows the steps of Phase 2, in which each object within the condemned region 352 that is referenced by one or more live objects in the same region, as marked in Phase 1, is marked as live.

TABLE 3

| | |
|---|---|
| 201 | Place the write barrier to cover condemned region |
| 203 | Initialize a list's origin, register TO-SCAN, to NIL |

TABLE 3-continued

| | |
|---|---|
| 205 | Scan condemned region, to link all objects whose mark word contains "MARK": |
| 207 | IF the word of the object being scanned has the value "MARK" then |
| 209 | add the object to the beginning of the list |
| 211 | Until TO-SCAN is empty do |
| 213 | Remove the first address from the list |
| 215 | Scan the words in the object at that address |
| 217 | IF the object refers to an unmarked object in the condemned region, |
| 219 | add the referent object to the list |
| 221 | Replace the contents of the mark word of the object just scanned with a pointer to itself. |

First the boundaries of the write barrier 370 are placed at the beginning and end of the condemned region (Step 201).

A special register 600, register TO-SCAN, points to a linked list of objects. It is initialized to 'NIL', so as to indicate an empty list (Step 203).

The condemned region is scanned to link all objects whose mark word contains the value 'MARK' (Step 205). If the mark word 1000 of the object being scanned has the value 'MARK' (Step 207), then that object is added to the beginning of the list (Step 209). Moreover, as indicated in Table 1 in the section of code beginning at statement 810, if write routine 46, by referring to the write barrier 370, detects that a reference to an object in the condemned region is written anywhere in memory (step 811), that object is also added to the beginning of the list pointed to by register TO-SCAN (step 812). Adding an object at the beginning of the list requires two steps. First, store the current content of the TO-SCAN register in the mark word of the object. Second, store the reference (address) of the object in the TO-SCAN register.

Specifically, and using FIG. 6 to illustrate, a list's origin, register TO-SCAN, is first set to 'NIL' (Step 203). When the MARK value in object 3's mark word is encountered (Step 207), a reference to object 3 is placed in TO-SCAN (Step 209). That places object 3 at the beginning of the list pointed to by TO-SCAN. Object 5 is then added to the list (Step 209), when it is encountered (Step 205). The results are shown in FIG. 6b.

Once all the marked objects have been linked, the list is traversed and all other objects in the condemned region that are referenced by objects in the list are added to the list. The objects in the list after having been scanned for references to other objects in the condemned region are removed from the list. These operations are shown in block 211.

In particular the following is repeated until the list pointed to by register TO-SCAN is empty, as indicated by the value 'NIL' in register TO-SCAN (Step 211). First remove the first address from the list (Step 213). Then the words in the object at that address are scanned (Step 215). If that scan finds a referent object in the condemned region whose mark word 1000 has the value 'UNMARKED' (Step 217), that object is linked into the list by adding it to the beginning of the list (Step 219). Finally, the procedure replaces the contents of the mark word of the object just scanned with a pointer to itself (Step 221).

Figure 6B:
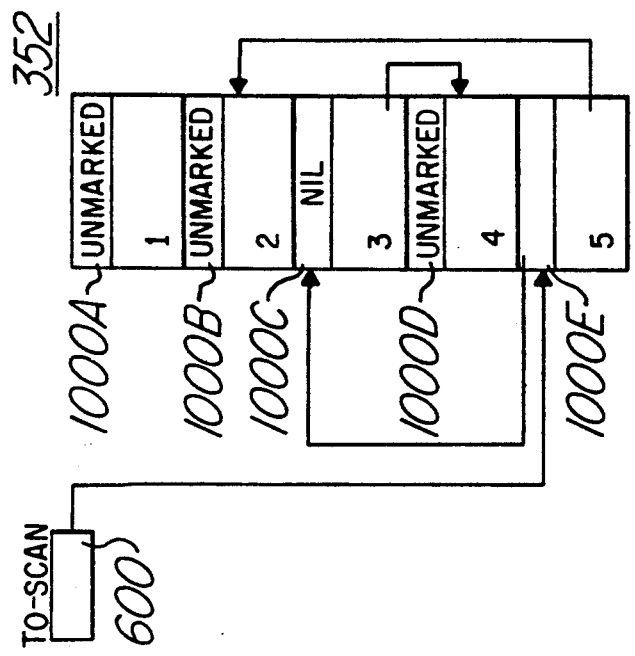
FIGS. 6(a), 6(b), 6(c) and 6(d) together show an example of a condemned region during phase two of a garbage collector according to a preferred embodiment.
Figure 6A:
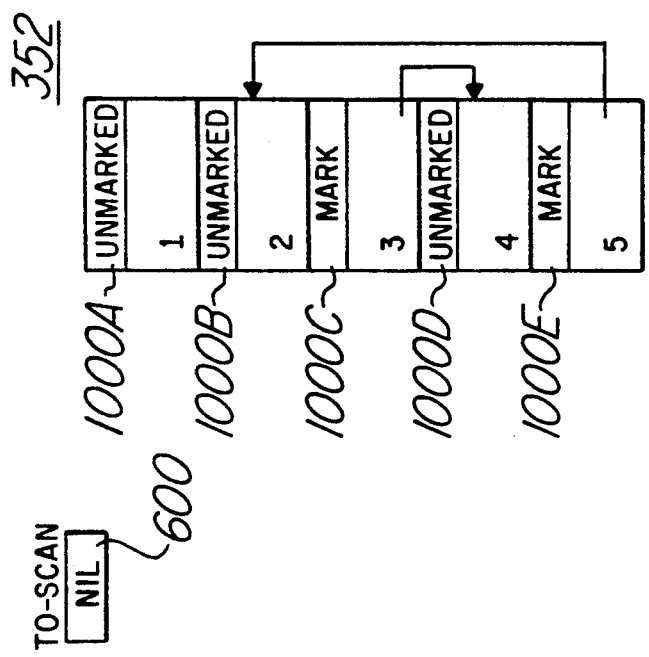
Figure 6D:
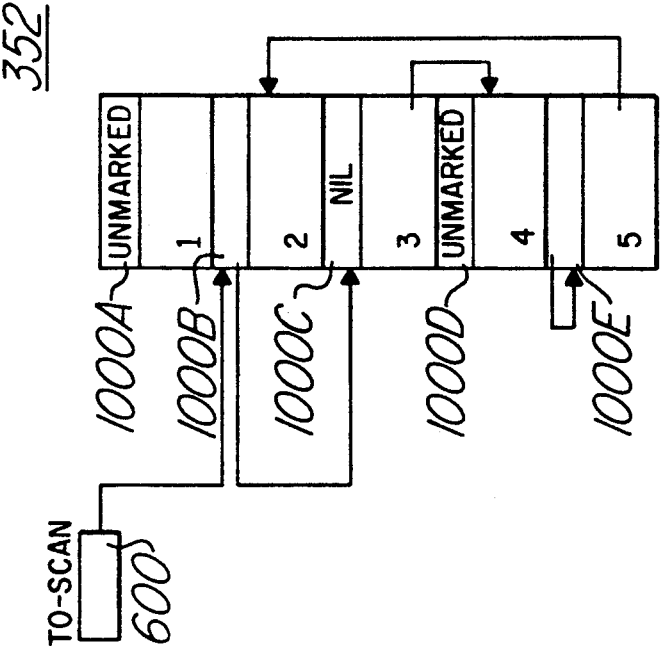
Figure 6C:
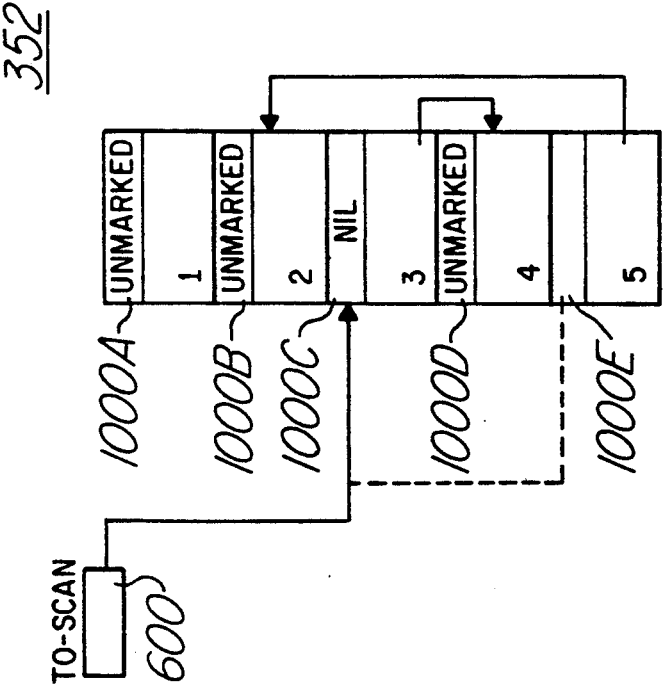

FIG. 6c and d illustrate this process. First, object 5 has been removed from the list (Step 213). While examining the contents of object 5's cells (Step 215), the reference to object 2 is determined to be a reference to an object in the same region and object 2's mark word has the value 'UNMARKED' (Step 217) and is therefore placed on the list (Step 219). Finally, object 5's mark word is given a pointer to itself (Step 221).

When the list is once again empty; i.e., TO-SCAN has a 'NIL' value, all objects which should survive reclamation will be self-referenced in their mark words. In the illustration, this will be objects 2,3,4, and 5. All other objects, the "garbage" objects, will have the value 'UNMARKED' in their mark words.

Phase 3

Table 4 shows the procedure of Phase 3 of the garbage collector. In this phase each live object within the condemned region, as marked in Phases 1 and 2, is transported to the current allocation location.

TABLE 4

| | |
|---|---|
| 301 | Set write barrier boundaries to the current allocation pointer and the beginning of the condemned region, as shown in FIG. 7a. |
| 303 | For each object in the condemned region do |
| 305 | If the mark word of the object is not UNMARKED then: |
| 307 | Transport the object: begin critical section 308 |
| 309 | The mark word of the object is given the value of the allocation pointer |
| 311 | The location pointed to by the allocation pointer is given the value, as an integer, of the object's mark word address |
| 313 | The object's size in words is added to the allocation pointer |
| 315 | The write barrier's end boundary is extended to the location of the last word of the object that is being transported. end of critical section begin interruptable section 316 |
| 317 | Transport each word of the object to the newly created copy. end interruptable section |

The first step (Step 301) is to reset the boundaries of the write barrier 370 to the current allocation pointer and the beginning of the condemned region, as shown in FIG. 7a.

Then the condemned region is stepped through object-by-object (Step 303). For each object the procedure examines the mark word to determine whether it contains the 'UNMARKED' value (Step 305). In which case the object is passed over, because there is no need to examine the cells of such objects. If the mark word has any value other than 'UNMARKED', the object is transported (Block 307, including steps 309 through 317).

The transport of an object involves both a critical section 308, which may not be interrupted, and an interruptable section 316. In the critical section 308, which occurs first, comprises the steps 309 through 315. First the mark word of the object within the condemned region is given the value of the allocation pointer (Step 309). Then the location pointed to by the allocation pointer is given the value, as an integer, of the condemned region object's mark word address (Step 311). The condemned region object's size in words, including its mark word, is added to the allocation pointer 340 (Step 313). This effectively sets up the shell, or uninitialized copy, for the transported object. The mark words of the object within the condemned region and the transported object point one to the other, which becomes useful for later phases. Lastly, the write barrier's end boundary is extended to the location of the last word of the object within the condemned region that is about to be transported (Step 315).

Transporting each word of the object within the condemned region to the newly created copy then proceeds, with interruptions possible, until the transport is complete (Step 317).

In FIG. 7b, which illustrates phase 3, object 1 has been passed over (Step 305). Object 2, however, has a self-reference in its mark word (Step 305). It is therefore transported (Step 307), the necessary references are placed in the mark words of object 2 and object 2' (Steps 309 and 311), the allocation pointer is advanced beyond object 2' (Step 313), and the write barrier 370 is extended to include object 2 (Step 315).

Again referring to Table 1, if an application process 24 preempts the garbage collector 32 and it requires that a value be written into memory 34, the address to be written to is compared with the write barrier 370 boundary locations (Step 814). If the address is within the write barrier 370 and the object which contains the cell at that address has a reference to another object in its mark word 1000 (Step 814), a "double" write is done (Step 816). The first write is to the address as expected. The address contained in the written object's mark word 1000 is then used to derive the address where a duplicate write is performed.

Looking again at FIG. 7b, suppose an application process requires that a new value be written to the second word of object 2. As it is written, the write routine 46 would detect that the address to which the write is being made is within the write barrier and that the mark word of object 2 has a pointer to another object (Step 814 of Table 1). Therefore, the same value is written to the second word of the other object (object 2') (Step 816 of Table 1). In effect, the same value is written to the same cell in both an object within the condemned region and its transported copy. By taking these measures of "double" writes, at any time during this phase, even during the non-critical portion of a transport, preemption can safely occur Both copies of an object are kept consistent. Even a cell of a semi-transported object can be written to and the integrity of the object maintained. Thus, no critical section with time proportional to the object length is necessary.

Phase 4

Table 5 shows pseudocode for the procedure of Phase 4, in which all references to an object within the condemned region are updated to reference that object's transported copy.

TABLE 5

| | |
|---|---|
| 401 | Save a copy of the allocation pointer |
| 403 | Scan all boxed memory locations in allocated regions, beginning with the memory word following the condemned region and ending with the saved allocation pointer |
| 405 | If the word is a reference to an object within the condemned region |
| 407 | update the word to reference the object's transported copy. |

The write barrier 370 remains unchanged from Phase 3.

A copy of the allocation pointer is first saved (Step 401). All boxed memory locations in allocated regions are again scanned, beginning with the memory word following the condemned region to the saved allocation pointer (Step 403). Next determine whether a word is a reference to an object within the condemned region (Step 405). If that is the case, update it to reference the object's transported copy (Step 407). The transported copy's address is found or can be trivially derived from the mark word of the object within the condemned region.

Figure 8A:
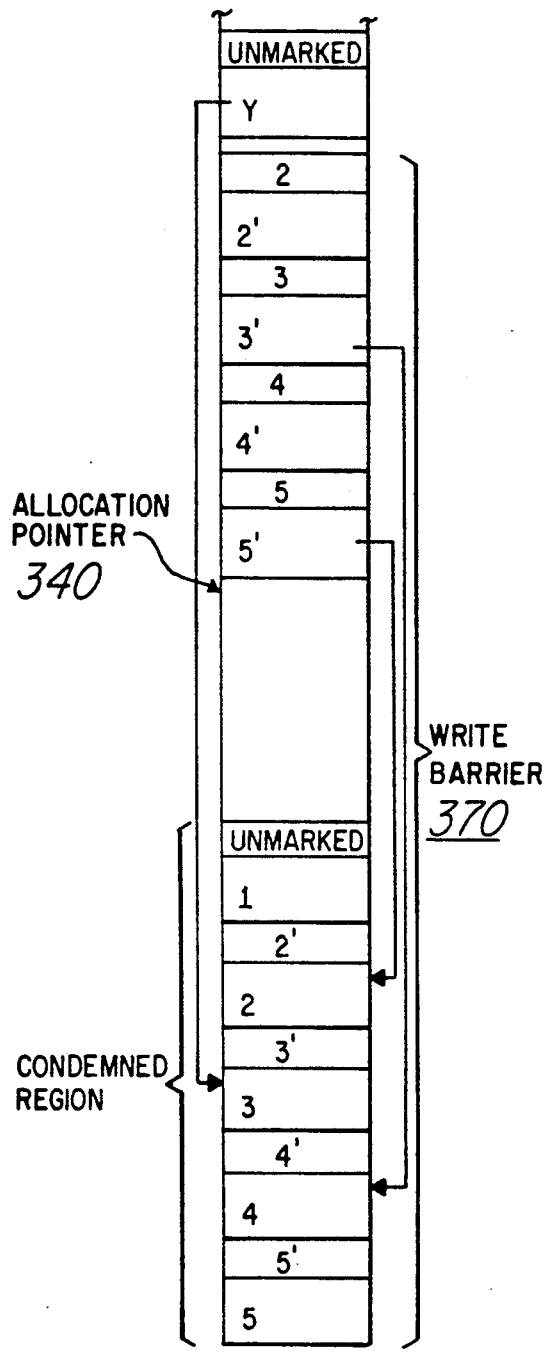
FIGS. 8(a) and 8(b) show an example of memory being processed by phase four of a garbage collector according to the present invention.
Figure 8B:
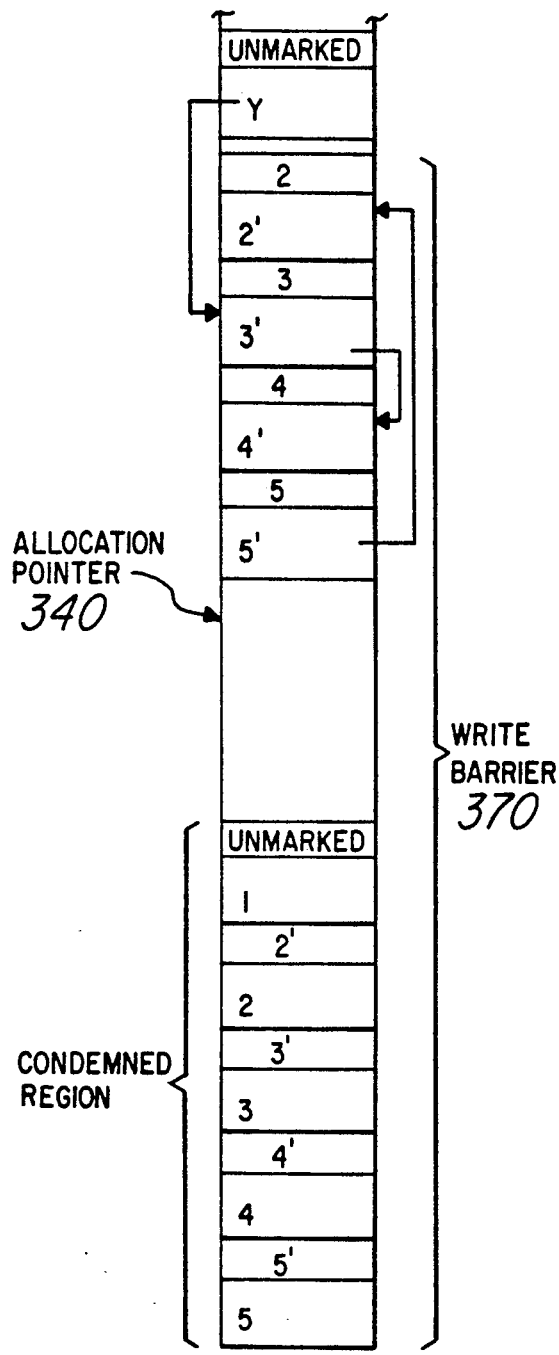

In the illustration of FIG. 8a, all the live objects in the condemned region have transported copies When object Y is scanned (Block 403), the reference to object 3 within the condemned region is detected (Step 405). Using the contents of object 3's mark word to determine the address of object 3', the cell in object Y is updated to point to object 3' (Step 407), as shown in FIG. 8b. Note that the transported objects also have references to objects within the condemned region. Object 3' has a reference to object 4, and object 5' has a reference to object 2. The portion of memory where the transported copies reside is also scanned during Phase 4 (Block 403) and references to objects within the condemned region (Step 405) are updated (Step 407).

Referring to Table 1, the write barrier has two purposes during Phase 4. First, to force a "double" write to objects within the condemned region and their transported copies, just as it did during Phase 3 (Steps 814 and 816). Second, to avoid writing a reference to an object allocated within the condemned region (Steps 820 and 822). Detecting the need for a "double" write and performing a "double" write are described above in reference to Phase 3.

Updating a reference to an object within the condemned region is as follows. First, if a write to memory is a reference to an object within the condemned region, detected by determining that the value to be written is a pointer and the pointer's address is within the boundaries of the condemned region (Step 820), the reference to be written is modified to reference the transported copy (Step 822). The reference address is derived from the mark word of the object within the condemned region. The reason for "double" writes is slightly different in this phase. Before Phase 4 begins, all objects have been transported. Therefore, the purpose is not to keep a semi-transported object accurate. During Phase 4, references will exist to both objects within the condemned region and their transported copies. For a given object within the condemned region, two physical objects exist which are logically one object. Thus, two different application processes may have references to different physical objects to which they read and write; when, in fact, the two processes expect to be reading and writing from the same object.

The object identity predicate, e.g., "EQ" in LISP, becomes complicated during Phase 4. The purpose of the test is to determine if two pointers reference the same object. Normally, a simple bit comparison of the addresses referenced is done. The complication is due to the fact that, during this phase, it is possible to have one logical object existing as two separate physical objects, as noted above. Logically, a test for object identity of the same object should return true; however, a bit comparison of the addresses of an object within the condemned region and its transported copy (both logically the same object) will return false. The solution is to expand the test for object identity during Phase 4. First a normal bit comparison of addresses is done, returning true if the addresses are identical. If the comparison proves false, check the mark word of one of the objects referenced to determine if it points to the other object referenced. If it indeed points to the other object, it is certain that both references of the object identity test are pointing to the same logical object and the object identity test returns "true"; otherwise, it returns "false".

Phase 5

Table 6 shows pseudocode for the procedure of the fifth and final phase of the garbage collector 32, in which each transported object's mark word is re-initialized.

TABLE 6

| | |
|---|---|
| 501 | Make the write barrier inoperative |
| 503 | Visit each object in the area of memory where the transported objects are placed |
| 507 | Reset the object's mark word to UNMARKED |

The first step is to make the write barrier 370 inoperative (Step 501). A simple way to make the write barrier inoperative is to use boundary values that ensure that the address range check always fails.

Then the area of memory where the transported objects are placed is stepped through by mark word (Step 503). As each mark word is located, it is reset to the UNMARKED value (Step 505).

An advantage achieved by the garbage collector 32, and the double writes of write routine 46 is that no read barrier is requested. This reduces the overhead on application programs 24 because no special handling is required on read operations, which are typically more common than write operations.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

We claim:

1. A method for garbage collecting a memory concurrently with the execution of other processes, comprising the steps of:
    allocating a required space in a surviving region of said memory to receive an object to be transported from a condemned region of memory during a non-interruptable phase of garbage collection, copying during an interruptable phase of garbage collection each word of said object to be transported from said condemned region to said allocated space; and
    maintaining consistency between said object from said condemned space and said allocated space by writing to both said object and said allocated space whenever an application program updates said object and whenever an application program updates said allocated space.

2. A computer system for executing application programs in hard real-time, comprising:
    a central processing unit (CPU) for executing said application programs and system programs;
    a computer memory in which said application programs allocate objects as blocks of memory;
    write means by means of which each said application programs store values in said memory in a store operation and through which each said store operation is monitored;

a garbage collector for executing concurrently with said application programs on said CPU to recover unused blocks of said memory, said garbage collector coupled to said write means for controlling the behavior of said write means based on phases of operation of said garbage collector, said garbage collector during at least one phase copies one original object from a first location of said memory to a second location of said memory; and said write means responsive to said garbage collector in said one phase for storing values written by said application programs in both said original object at said first location and the copy at said second location.

3. The computer system of claim 2, wherein said write means is a logic circuit.

4. The computer system of claim 2 wherein said write means is a write routine.

5. The computer system of claim 4, further comprising a subroutine library for linking into said application programs and which comprises said write routine.

6. The computer system of claim 2, wherein said garbage collector further comprises code operable to change all references to said original object so that said references refer to said copy.

* * * * *